United States Patent
De Ferra et al.

(10) Patent No.: US 10,787,469 B2
(45) Date of Patent: Sep. 29, 2020

(54) PROCESS FOR THE PURIFICATION OF L-α-GLYCEROPHOSPHORYLCHOLINE

(71) Applicant: Chemi S.P.A., Cinisello Balsamo (IT)

(72) Inventors: Lorenzo De Ferra, Patrica (IT); Mauro Anibaldi, Monte Porzio Catone (IT); Maurizio Zenoni, Ferentino (IT); Fabrizio Cocchi, Rome (IT)

( * ) Notice: Subject to any disclaimer, the term of this patent is extended or adjusted under 35 U.S.C. 154(b) by 0 days.

(21) Appl. No.: 16/360,052

(22) Filed: Mar. 21, 2019

(65) Prior Publication Data

US 2019/0218234 A1    Jul. 18, 2019

Related U.S. Application Data

(62) Division of application No. 15/317,441, filed as application No. PCT/IB2015/054346 on Jun. 9, 2015, now abandoned.

(30) Foreign Application Priority Data

Jun. 10, 2014    (IT) .............................. MI2014A1053

(51) Int. Cl.

| C07F 9/10 | (2006.01) |
|---|---|
| C07F 9/6574 | (2006.01) |
| C07F 9/09 | (2006.01) |
| B01D 15/08 | (2006.01) |
| G01N 21/49 | (2006.01) |
| G01N 30/02 | (2006.01) |

(52) U.S. Cl.
CPC .............. *C07F 9/103* (2013.01); *B01D 15/08* (2013.01); *C07F 9/091* (2013.01); *C07F 9/106* (2013.01); *C07F 9/65742* (2013.01); *G01N 21/49* (2013.01); *G01N 30/02* (2013.01); *G01N 2030/027* (2013.01)

(58) Field of Classification Search
CPC ..................................................... C07F 9/103
See application file for complete search history.

(56) References Cited

U.S. PATENT DOCUMENTS

| 6,229,605 B1 | 5/2001 | Benedict |
| 2012/0244583 A1 | 9/2012 | Liu et al. |

FOREIGN PATENT DOCUMENTS

| CN | 102093410 A | 6/2011 |
| CN | 102260286 A | 11/2011 |
| CN | 103172659 A | 6/2013 |
| CN | 103193821 A | 7/2013 |
| EP | 0575717 A1 | 12/1993 |
| JP | 63225387 | 9/1988 |
| JP | 2002275187 A | 9/2002 |
| JP | 2013136025 A | 7/2013 |
| WO | 1990013552 A1 | 11/1990 |
| WO | 2007145476 A1 | 12/2007 |
| WO | 2012099037 A1 | 7/2012 |

OTHER PUBLICATIONS

Chinese Office Action dated Nov. 1, 2018 in connection with couterpart Chinese application.
Henry C., "In the spray with ELSDs," Analytical Chemistry News & Features, Sep. 1, 1997, pp. 561-563.
HPLC Columns YMC Classics.
Japanese Office Action dated Nov. 20, 2018 in connection with the above-identified matter.
Kielbowicz, et al., "An LC method for the analysis of phosphatidylcholine hydrolysis products and its application to the monitoring of the acyl migration process," Talanta 94 (2012), 22-29.
Office Action dated Sep. 26, 2018 in connection with counterpart columbian patent application No. NC2016/0005143.
Search Report of PCT/IB2015/054346 dated Jul. 28, 2015.
Written Opinion of PCT/IB2015/054346 of 28 Luglio 2015.
YMC HPLC columngs Applications Notebook (2003).
Zhang, et al., "Purification of alpha-glycerylphosphorylcholine by column chromatography," Journal of Chromatography, Elsevier Science Publishers V.V, NL, vol. 1220, Dec. 1, 2011, pp. 108-114.
Zhang, et al., "Purification of L-alpha Glycerolphosphorylcholine from the enzyme reaction solutions by resin column chormatography," J. Am Oil Chem Soc. (2012) 89:1155-1163.
Fallon et al., "High Performance Liquid Chromatography: Experimental Method for Biochemistry 9", Tokyo Dagaku Doujin Co. Ltd., Sep. 20, 1989, pp. 80, 81 and 174-175.

*Primary Examiner* — Shawquia Jackson
(74) *Attorney, Agent, or Firm* — Silvia Salvadori, P.C.; Silvia Salvadori

(57) ABSTRACT

A process for the purification of L-α-glycerophosphorylcholine is described, wherein L-α-glycerophosphorylcholine is crystallized from DMSO or from a mixture of DMSO with at least another solvent, preferably selected from water, alcohol, halogenated solvents, ethers, esters and/or amides. Such a process allows to obtain L-α-glycerophosphorylcholine having a purity greater than 99.5%, preferably greater than 99.7%, even more preferably greater than or equal to 99.9%. A method for determining the purity of L-α-glycerophosphorylcholine is also described, comprising the elution of L-α-glycerophosphorylcholine through an HPLC column having an amino stationary phase, and subsequent detection of L-α-glycerophosphorylcholine itself, and any impurity thereof, by means of an Evaporative Light Scattering Detector type.

13 Claims, 13 Drawing Sheets

PROCESS FOR THE PURIFICATION OF L-α-GLYCEROPHOSPHORYLCHOLINE

This application is a divisional application of U.S. Non-Provisional application Ser. No. 15/317,441 filed on Dec. 9, 2016, which is a U.S. national stage of PCT/IB2015/054346 filed on 9 Jun. 2015, which claims priority to and the benefit of Italian Application No. MI2014A001053 filed on 10 Jun. 2014, the contents of which are all incorporated herein by reference in their entireties.

DESCRIPTION

The object of the present invention is a process for the purification of L-α-glycerophosphorylcholine, wherein L-α-glycerophosphorylcholine is crystallized from DMSO or from a mixture of DMSO with at least another solvent, preferably selected from water, alcohol, halogenated solvents, ethers, esters and/or amides. Such a process allows to obtain L-α-glycerophosphorylcholine, which also constitutes an object of the present invention, having a purity greater than 99.5%, preferably greater than 99.7%, even more preferably greater than or equal to 99.9%; in particular, it allows to obtain GPC contaminated by less than 0.1% by its β-GPC isomer and/or by less than 0.1% by the cyclic species cGP.

A further object of the present invention is represented by a method for determining the purity of L-α-glycerophosphorylcholine comprising the elution of L-α-glycerophosphorylcholine through an HPLC column having an amino stationary phase, and subsequent detection of L-α-glycerophosphorylcholine itself, and any impurity thereof, by means of an Evaporative Light Scattering Detector type.

The current economic and demographic trends have led to a general aging of the population, and this phenomenon is particularly marked in the richest regions of the globe.

The decline of individual capabilities with aging has, therefore, become a very important issue, and there is an increasing need of identifying methods that help to slow this decline.

In particular, the weakening of mental abilities is one of the most negative consequences of aging, and many research efforts are devoted to finding effective therapies to fight it.

In this area, one of the products of greatest interest is L-α-glycerophosphorylcholine (GPC), whose structure is shown below.

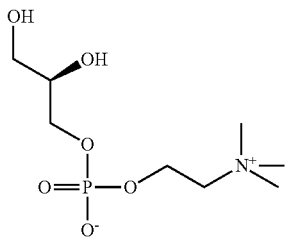 [SMILES: C[N+](C)(C)CCOP(=O)([O-])OC[C@H](O)CO]

GPC has a well-established use as therapeutic agent in the field of cognitive disorders, and its worldwide consumption, based on a wide confirmation of efficacy in medical practice and in numerous clinical trials, is well established.

The methods of preparation of GPC can be divided into two main types: those based on the deacetylation reaction of phosphatidylcholine of natural origin, and those wherein GPC is synthesized from raw materials commercially available in the market of chemical intermediates.

The methods of the first type have the advantage of using as raw material products, such as soy lecithin, already widely used in the food industry, and characterized in that their handling does not generate any particular safety risks.

The procedures based on the GPC synthetic approach may instead give rise to concerns in the management of the substances used and, in particular, of the chiral synthetic precursors. These are mainly R-glycidol and R-chloropropanediol (structures I and II outlined below, respectively) and, in both cases, these are alkylating molecules having considerable toxicity characteristics. It is therefore clear how their use may generate issues of dangerousness during the use and handling, and even danger in the consumption of GPC obtained from these, in case of residual traces or if other species were present (for example, intermediates or by-products) maintaining their toxicity characteristics.

   I

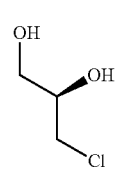   II

Whatever the GPC method of preparation is, the part relating to its purification and isolation will have a great impact on the quality of the product, in particular its chemical purity may influence its toxicity and therapeutic profile. Such purity is traditionally verified through "Thin Layer Chromatography" (TLC). This type of analysis has good versatility characteristics and allows to evaluate the sample as a whole, since all the components, from the most polar to the least polar, are viewable at the same time. This analytical technique is however not entirely satisfactory as regards the quantitative determination of any impurities and the separation of species with similar structural features, such as for example isomers with comparable polarity.

HPLC is the analytical technique most frequently adopted to overcome these TLC shortcomings; in the case of GPC, the use of HPLC resulted, however, less easy than usual due to the high polarity characteristics of the analyte, which limit the interaction with the stationary phases, and the absence of chromophores which make possible the use of a UV detector, i.e. the more prevalent detector in quality control laboratories. The published methods are unsatisfactory for sensitivity, and for the shape of the chromatographic signals having enlarged or asymmetric peaks; in these conditions there is a reduction of separation power, and there is the risk of having signals corresponding to certain species that are hidden under other chromatographic signals, resulting in loss of the ability to highlight any present impurities. See, for example: J. Am. Oil Chem. Soc (2012) 89:1155-1163; Talanta (2012) 94:22-29; Journal of Chromatography A (2012)1220:108-114, incorporated herein by reference.

This situation is badly related with current guidelines in the pharmaceutical field, which provide a detailed description of the impurities profile in the production of active ingredients intended for human use.

The development of new analytical techniques for the determination of the quality of the different preparations of GPC is therefore of primary importance and, in the event that the presence of impurities in preparations of GPC was highlighted with such analytical techniques, the definition of new standards of purity for GPC, and new purification procedures such as to enable the production of GPC in accordance with the current standards of quality.

DESCRIPTION OF THE INVENTION

Figure 1:
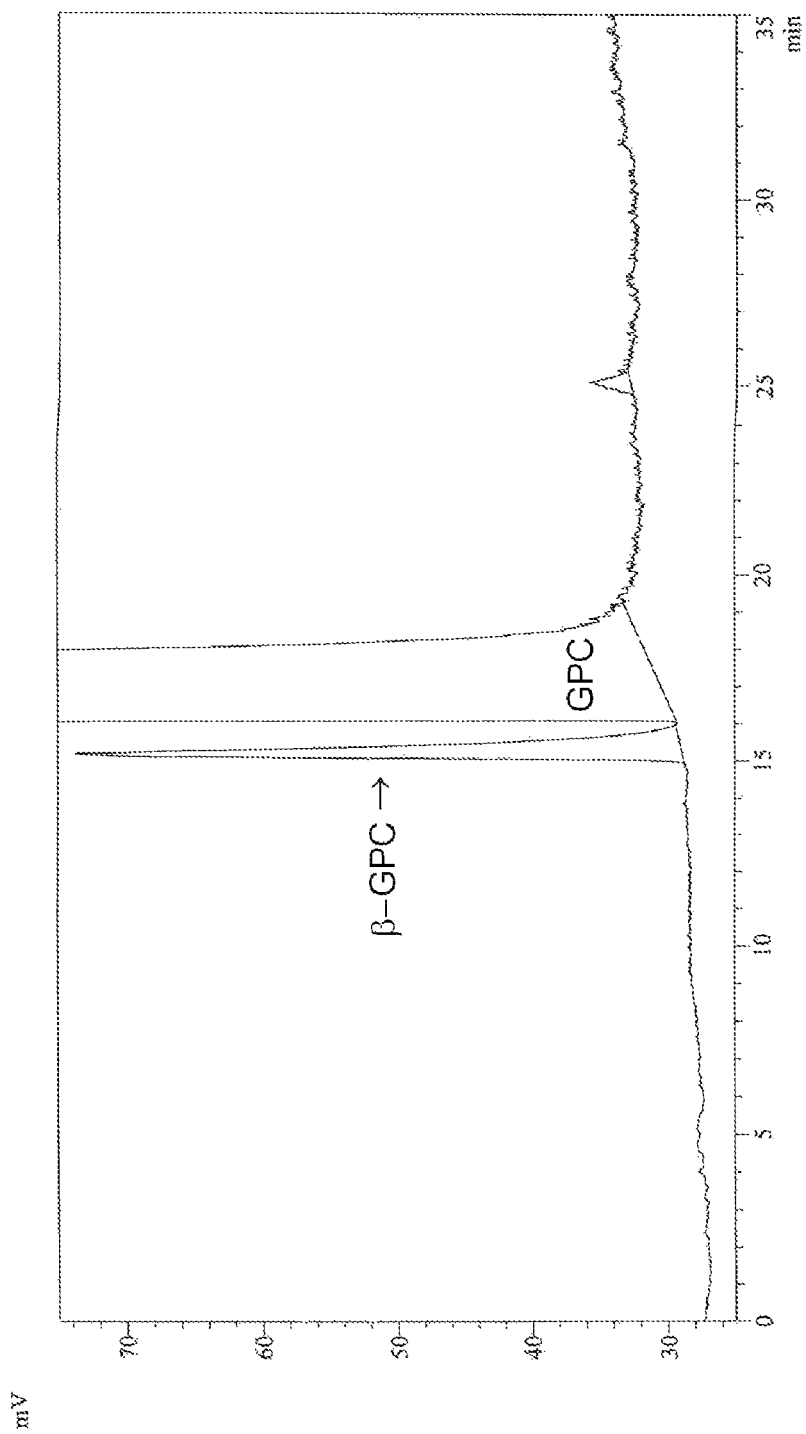
FIG. 1 HPLC-ELSD chromatogram of GPC obtained by procedure 1
Figure 2:
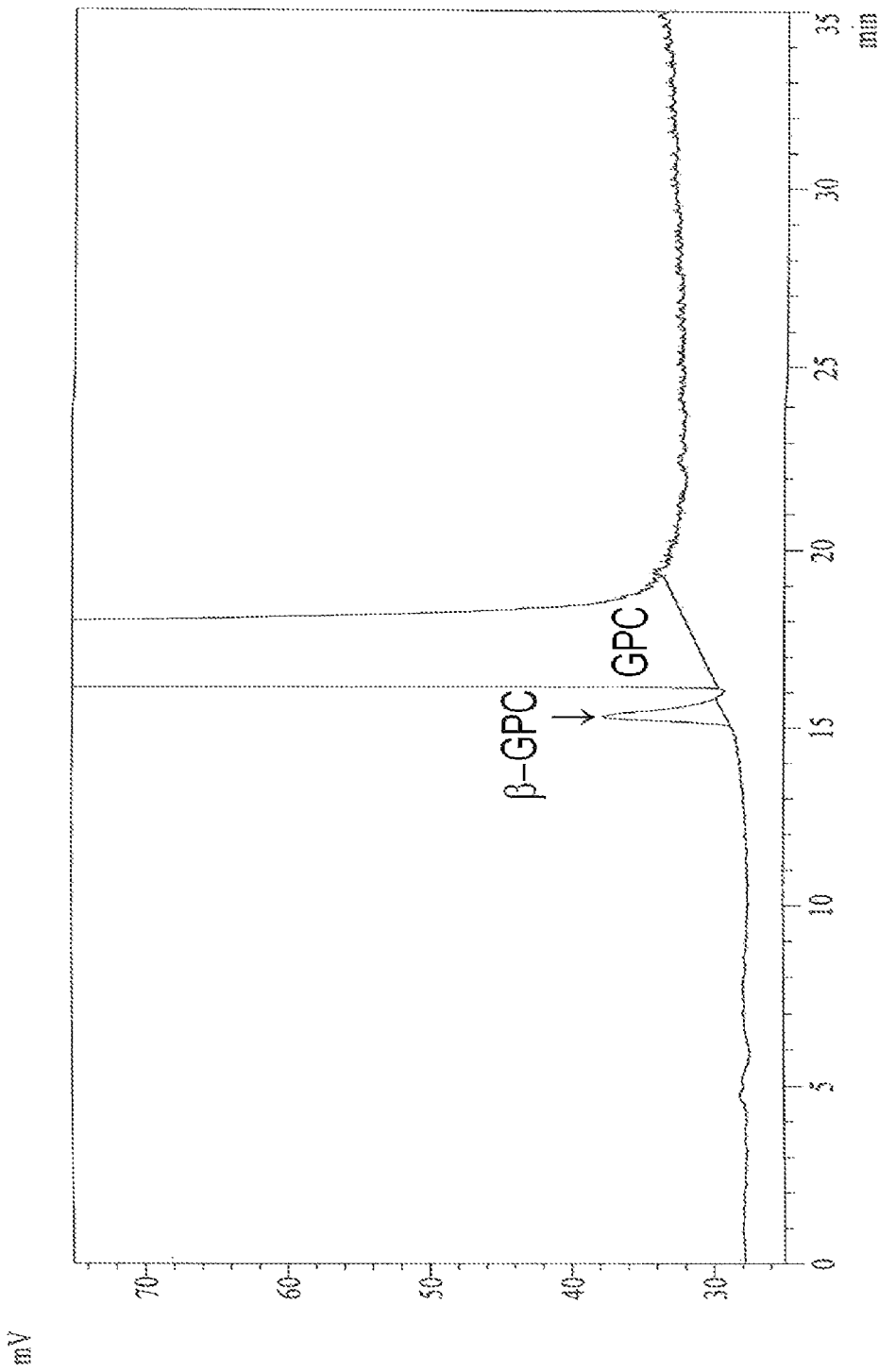
FIG. 2 HPLC-ELSD chromatogram of GPC obtained from example 2
Figure 3:
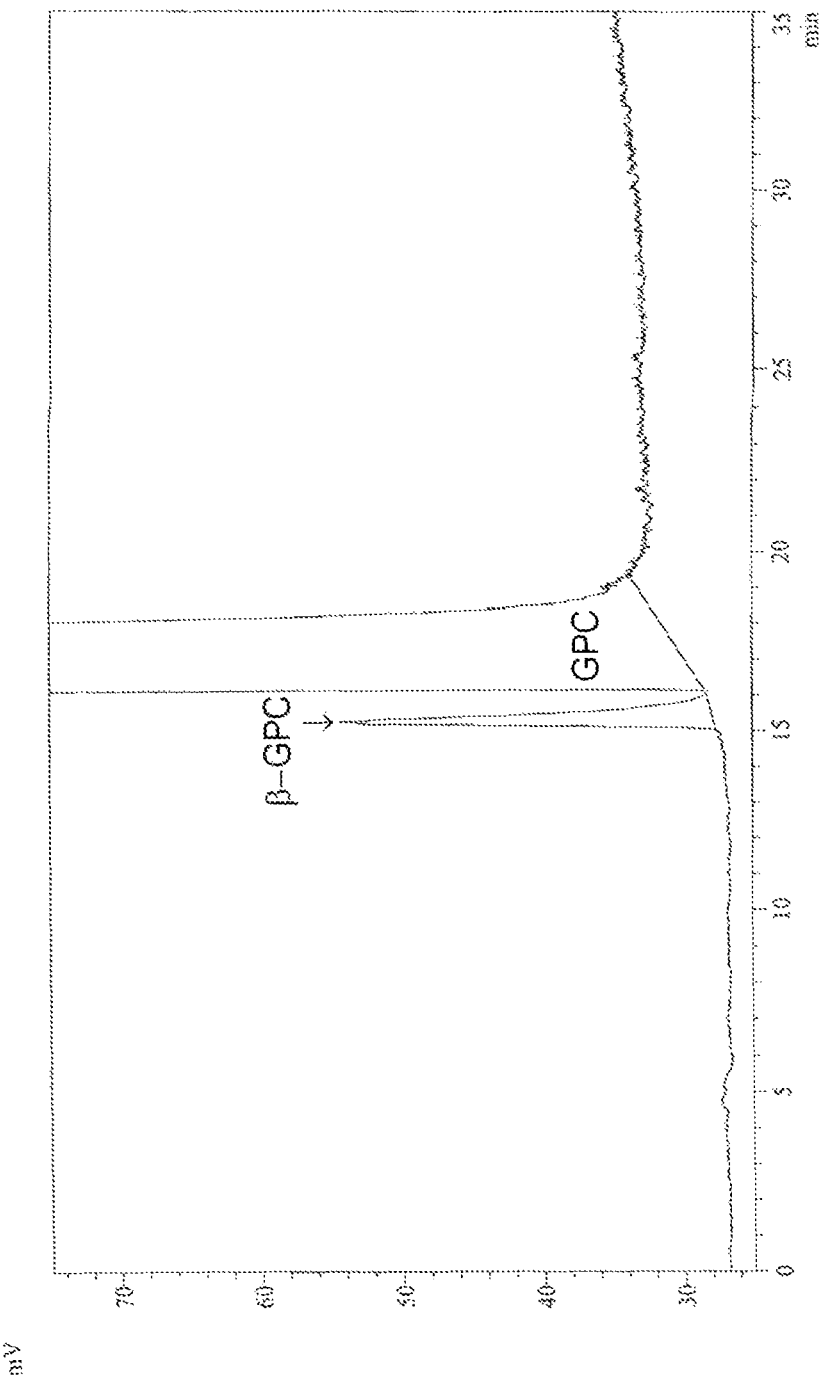
FIG. 3 HPLC-ELSD chromatogram of GPC obtained from example 1 (Comparative)
Figure 4:
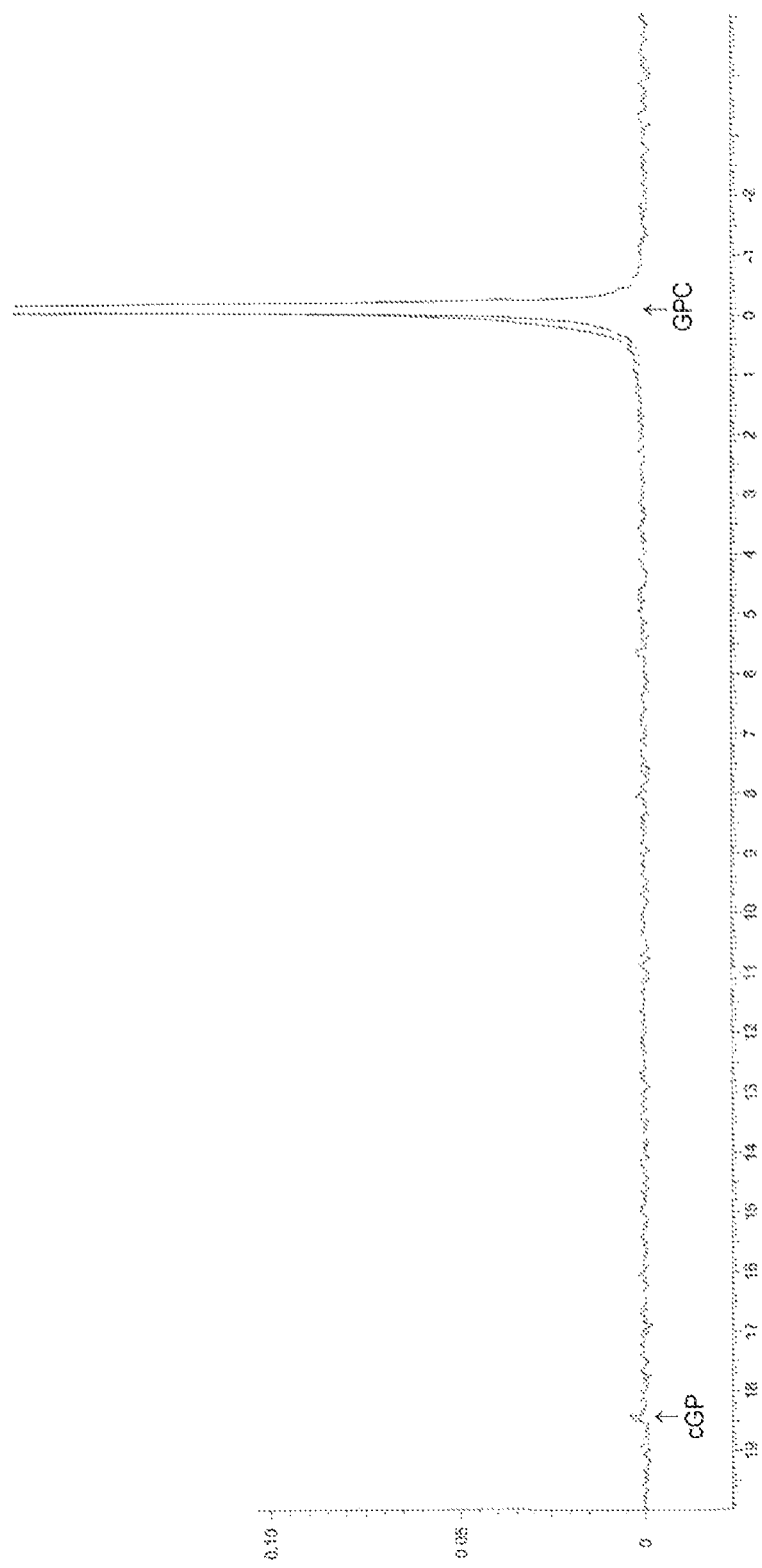
FIG. 4 $^{31}$P-NMR spectrum of GPC obtained by procedure 2
Figure 5:
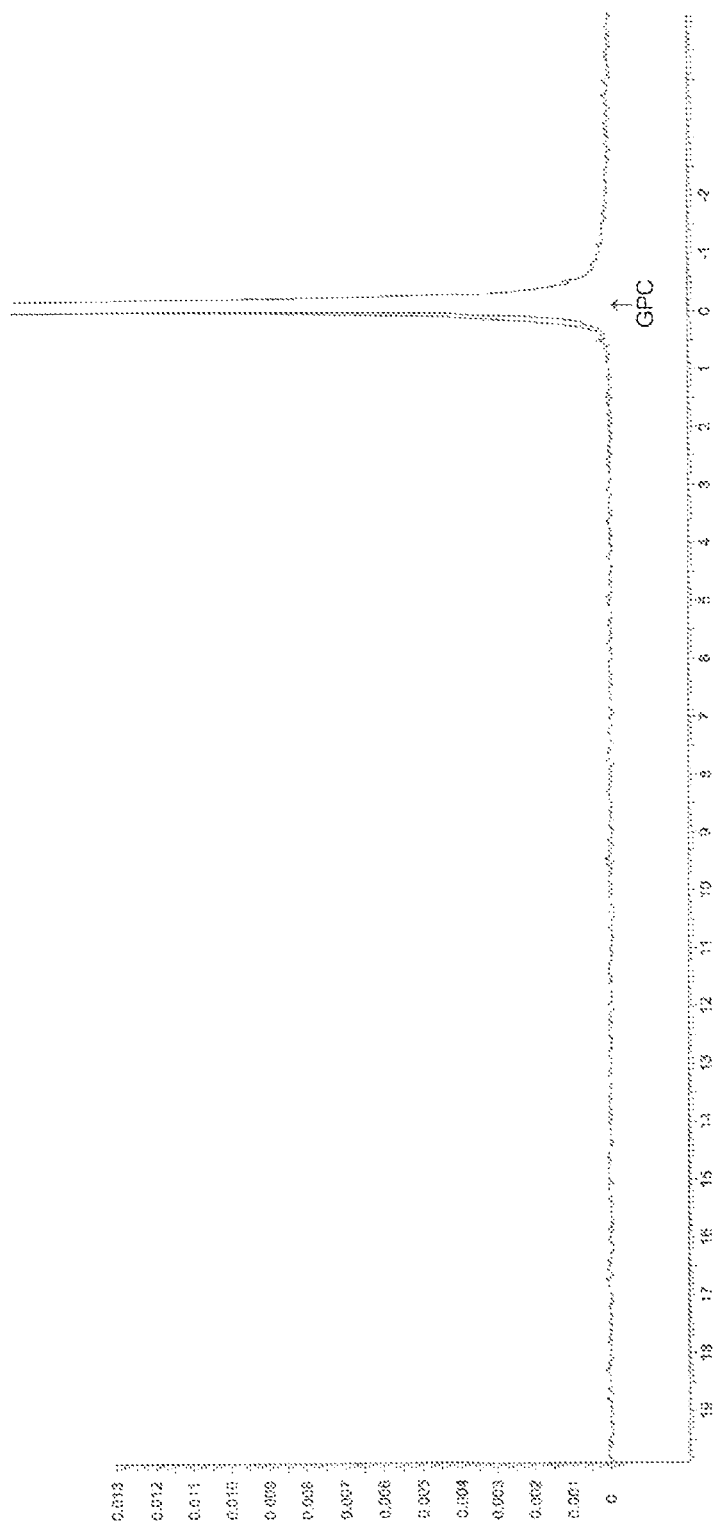
FIG. 5 $^{31}$P-NMR spectrum of GPC obtained from example 3
Figure 6:
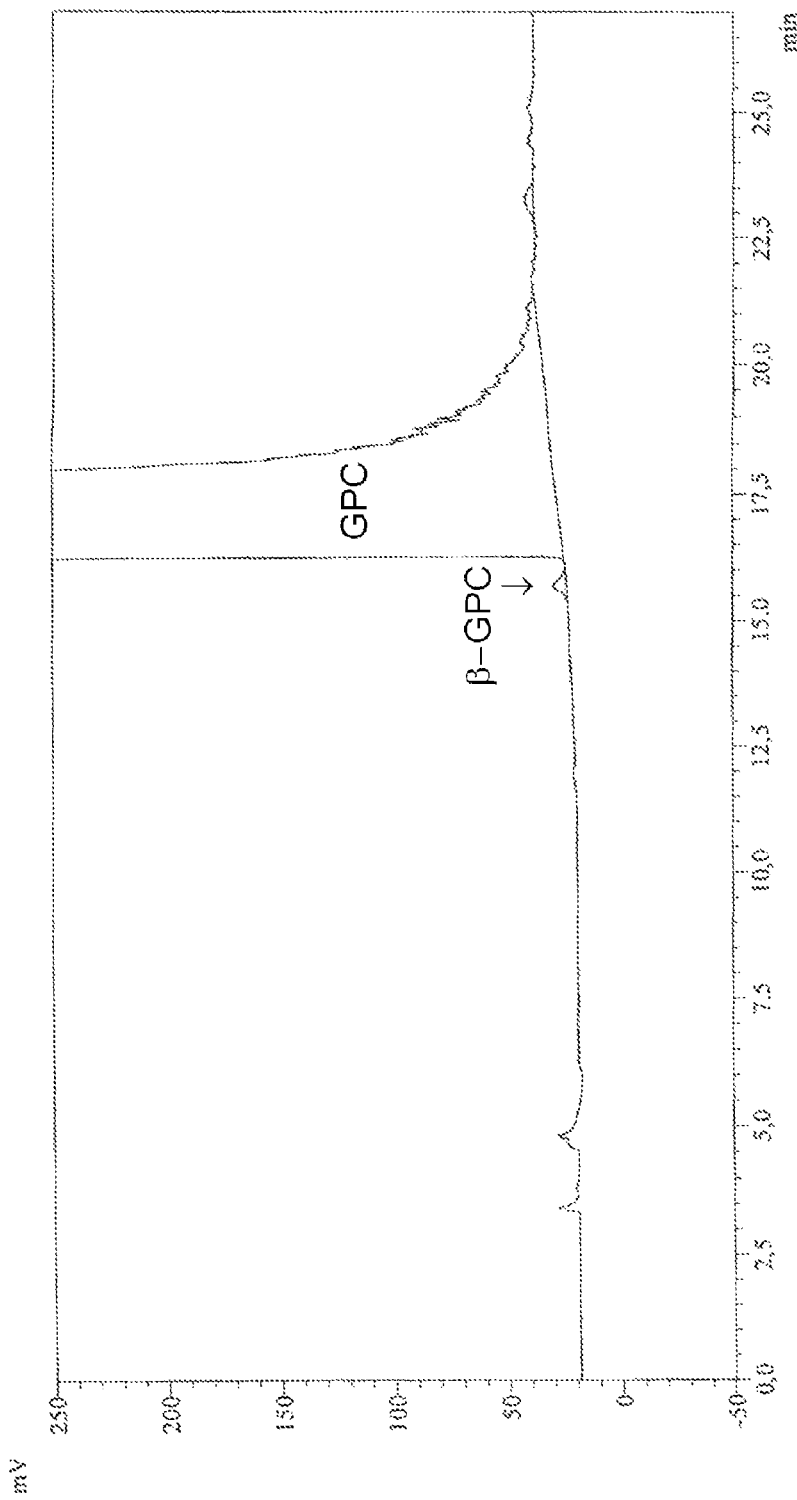
FIG. 6 HPLC-ELSD chromatogram of GPC obtained by procedure 1
Figure 7:
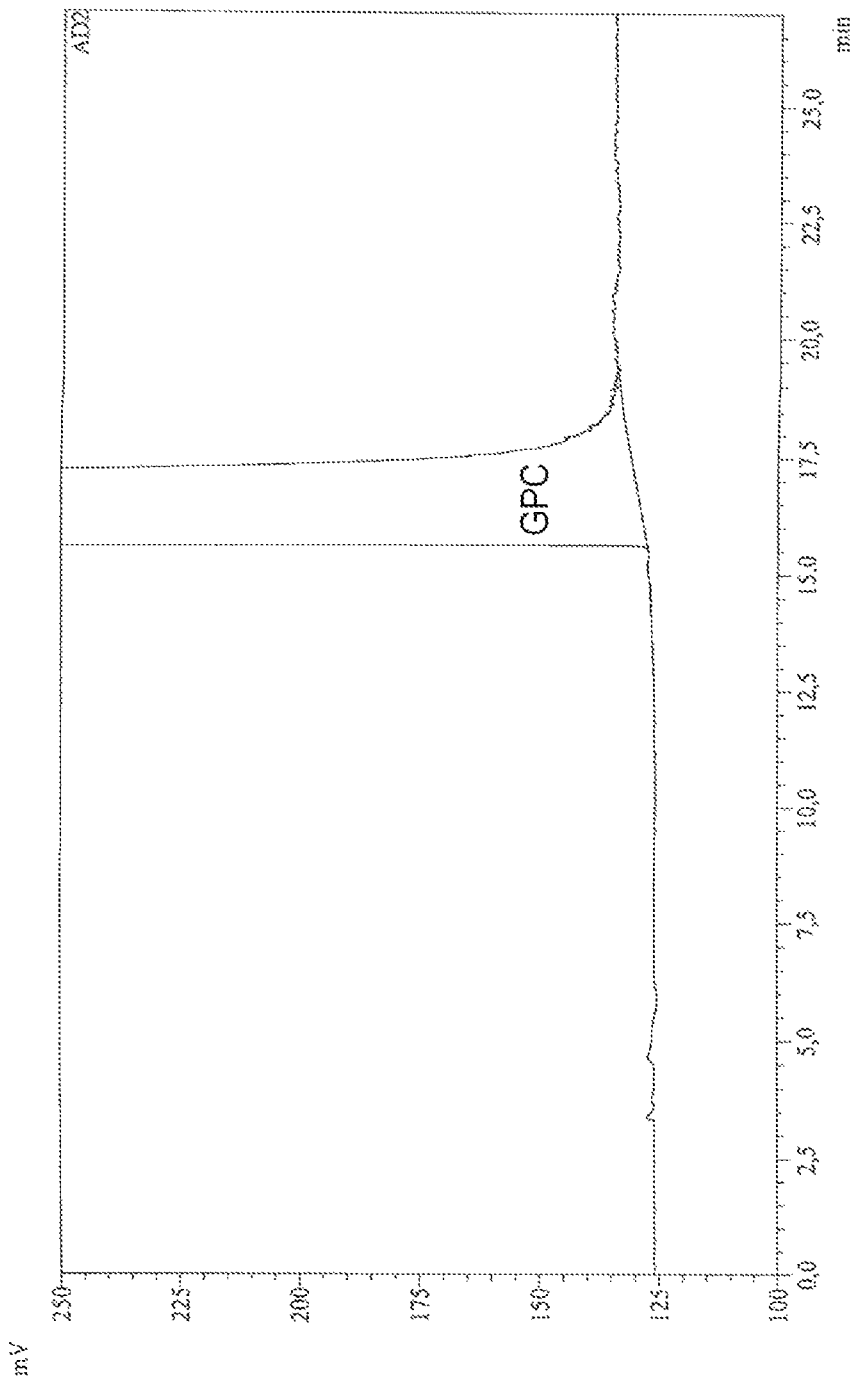
FIG. 7 HPLC-ELSD chromatogram of GPC obtained from example 3
Figure 8:
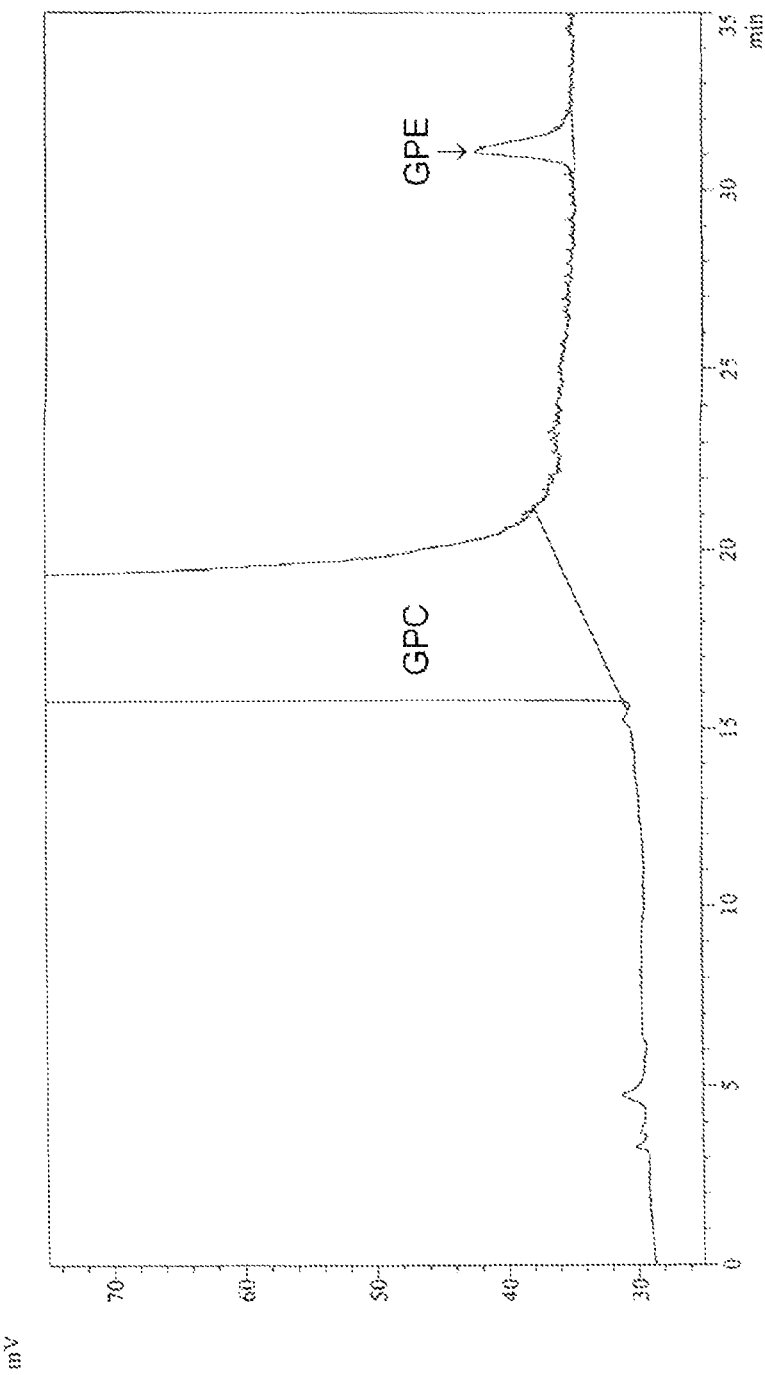
FIG. 8 HPLC-ELSD chromatogram of GPC obtained by procedure 3
Figure 9:
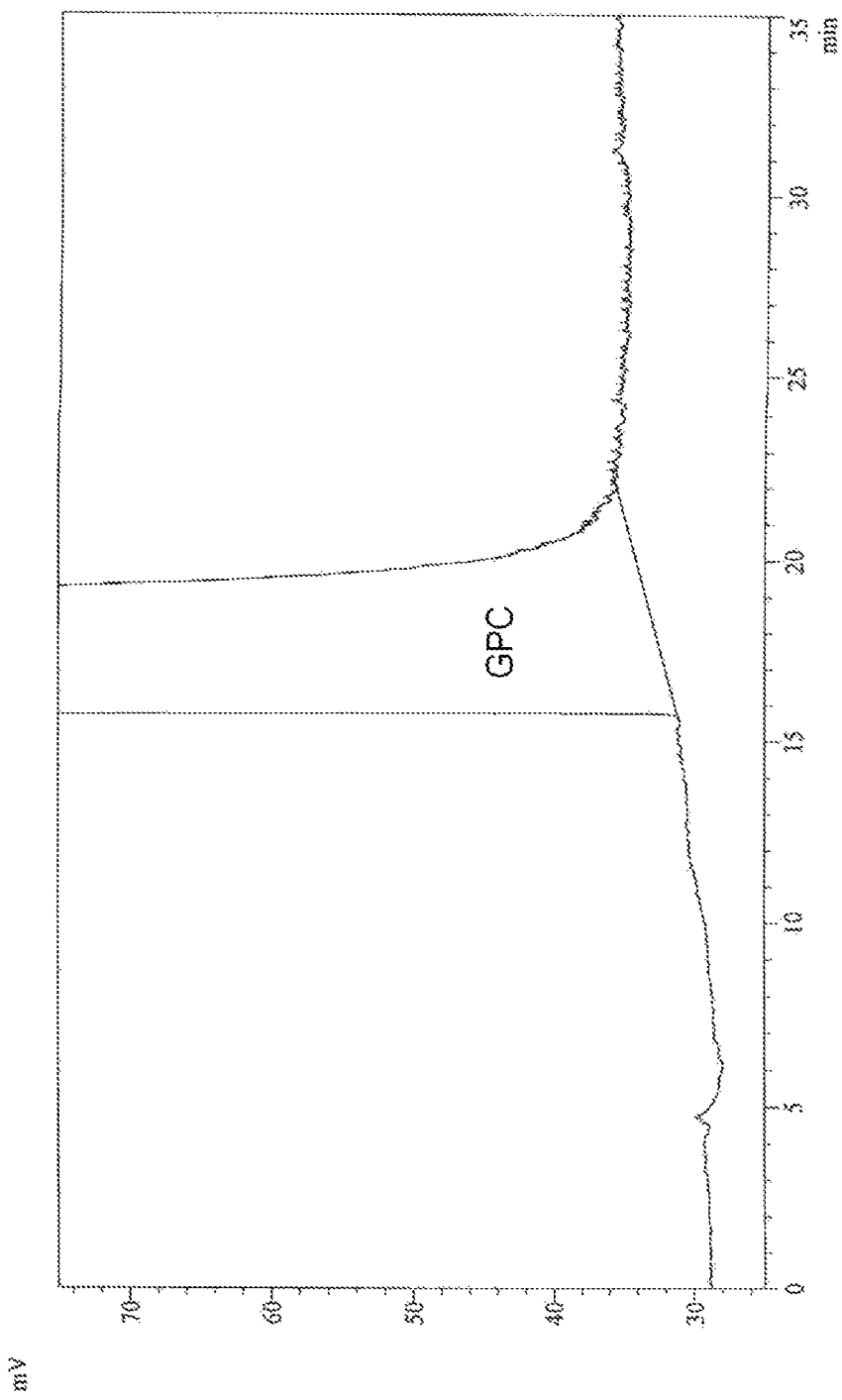
FIG. 9 HPLC-ELSD chromatogram of GPC obtained from example 4
Figure 10:
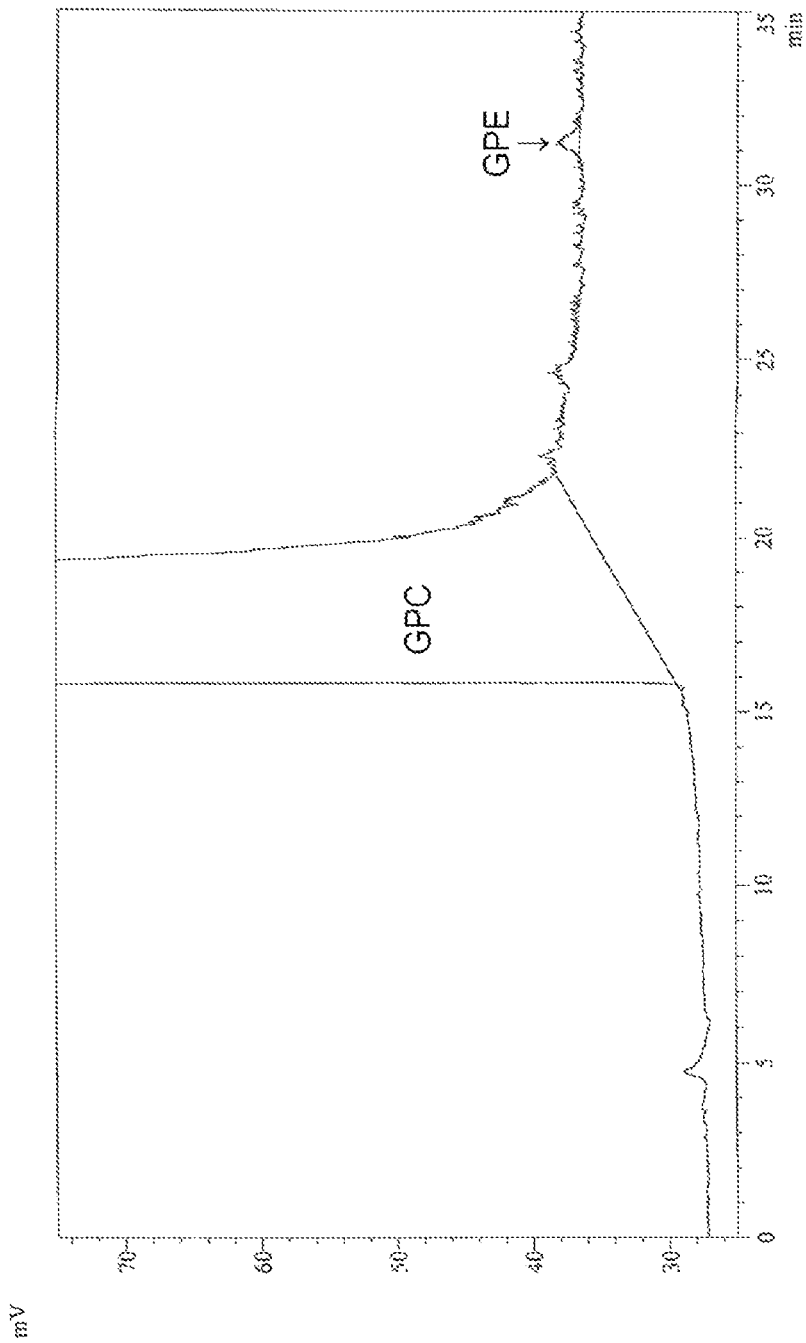
FIG. 10 HPLC-ELSD chromatogram of GPC obtained from example 5 (Comparative)
Figure 11:
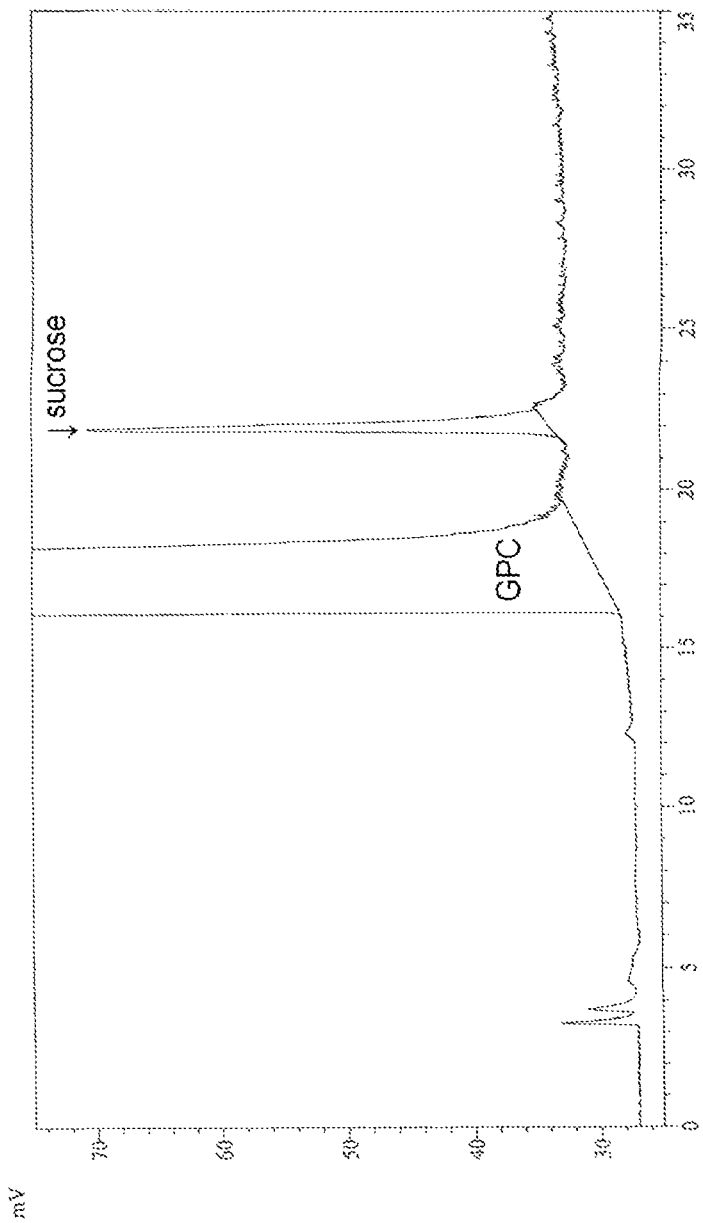
FIG. 11 HPLC-ELSD chromatogram of GPC obtained by procedure 4
Figure 12:
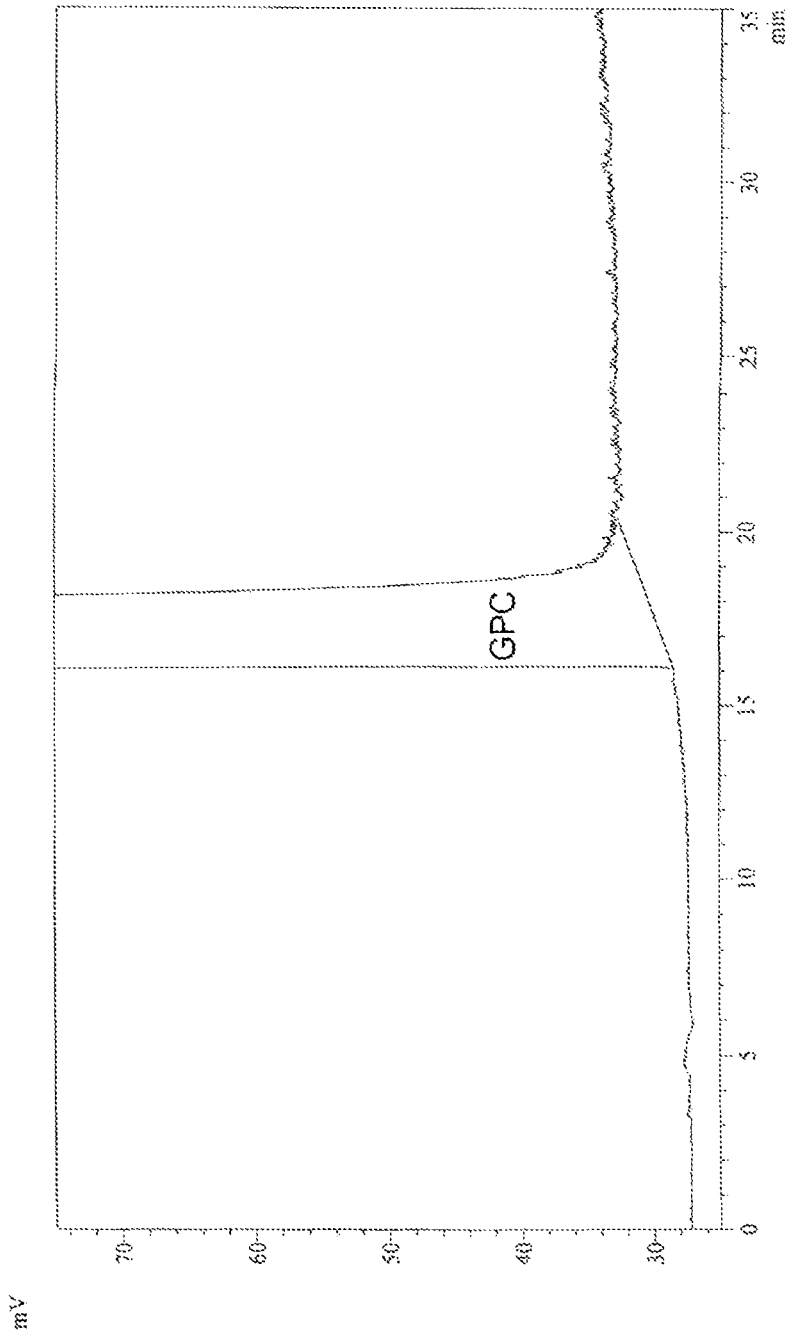
FIG. 12 HPLC-ELSD chromatogram of GPC obtained from example 6
Figure 13:
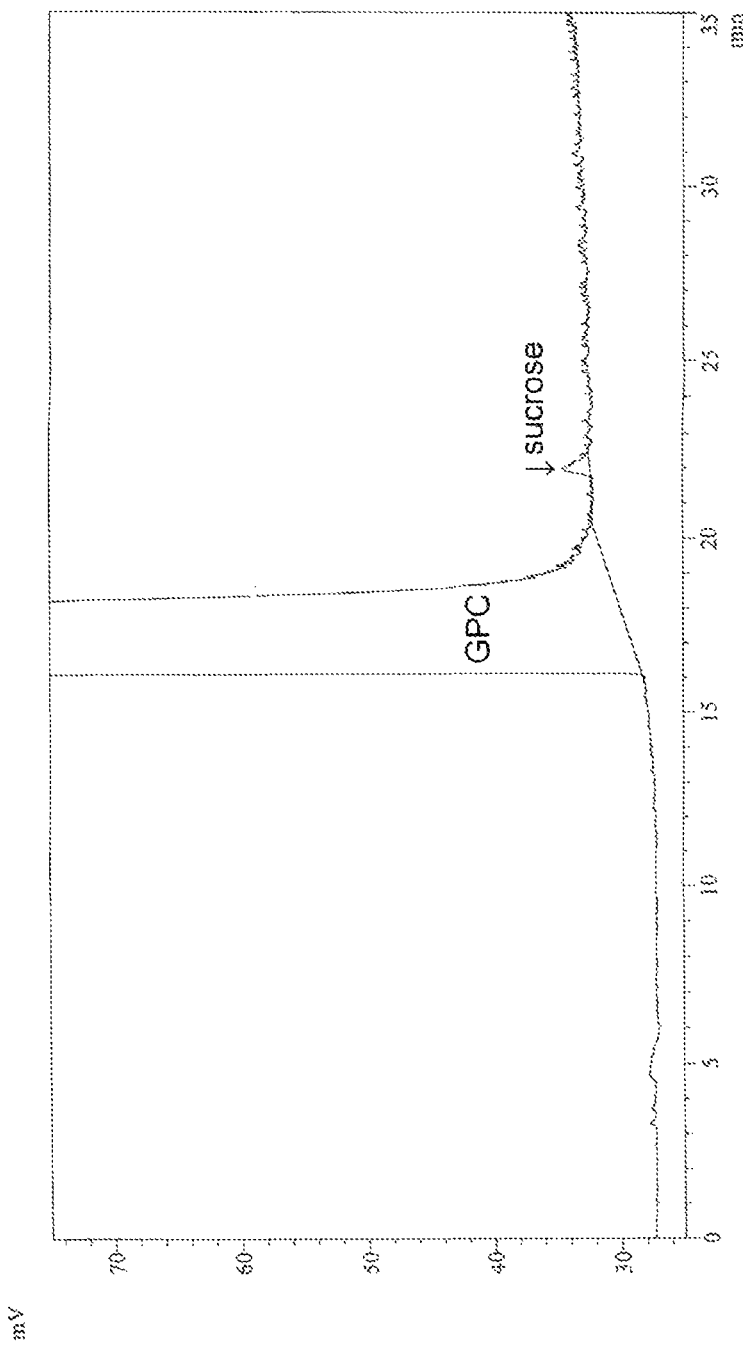
FIG. 13 HPLC-ELSD chromatogram of GPC obtained from example 7 (Comparative)

We have now unexpectedly found that in the HPLC analysis of GPC is possible to overcome the issues described above by suitably employing an amino HPLC chromatographic column type, i.e. those wherein an amino functionality is bound to the surface of the stationary phase. Several column of this type are commercially available: for example, Supelcosil™ LC-NH$_2$, Hypersil Gold™ amino, Zorbax® NH$_2$, YMC™ Polyamine II, Nucleosil® NH$_2$, Luna® NH$_2$. The stationary phase may consist of particles of support material, such as for example, silica, with a coating consisting of a polymer coating containing amino groups, preferably secondary and tertiary amino groups. The description of a stationary phase of this type is reported on pages 22 and 23 of the publication "HPLC Columns YMC Classics", by YMC Europe GmbH, incorporated herein by reference.

At the same time, an Evaporative Light Scattering Detector (ELSD) type will have to be used.

Such detectors are described, for example, in Anal. Chem (1997) 69:561A-563A and U.S. Pat. No. 6,229,605, incorporated herein by reference. These are tools in which the eluate is sent into an evaporation chamber where the solvent is evaporated to leave a mist of tiny sample particles that scatter a light beam. The detector response is proportional to the diffusion which is dependent on the amount of sample present; this system makes possible the detection of species devoid of chromophores, such as GPC, also while using not isocratic elution methods.

With this combination of stationary phase and detector, various eluents may be used and, in particular, systems suitably consisting of aqueous buffer systems, such as, for example, ammonium acetate buffer, possibly in combination with organic solvents such as, for example, methanol and/or acetonitrile. Such eluent systems may be used in isocratic mode, i.e. by keeping the same eluent for the entire duration of the chromatographic run, or in gradient mode, wherein the composition of the eluent varies during the chromatography according to a predetermined program. The optimization of the method of analysis will be performed following the teachings of the art.

An object of the present invention is therefore a method for determining the purity of L-α-glycerophosphorylcholine comprising the elution of L-α-glycerophosphorylcholine through an HPLC column having an amino stationary phase, and subsequent detection of L-α-glycerophosphorylcholine itself, and any impurity thereof, by means of an Evaporative Light Scattering Detector type.

The eluent phase or phases may consist of an aqueous solution, a polar organic solvent, or a mixture thereof; the aqueous solution preferably has a pH ranging between 3 and 6, even more preferably between 4 and 5. The polar organic solvent may be a $C_1$-$C_4$ alcohol, acetonitrile, or a mixture thereof; the $C_1$-$C_4$ alcohol is preferably methanol.

This combination allows to overcome the defect of the enlargement of the chromatographic peak corresponding to GPC, and at the same time allows to carry out the determination of GPC concentration with high sensitivity.

At the same time, it was found that it is possible to detect the presence in GPC preparations of other species deriving from the process of preparation of GPC starting from soya lecithin.

Among these species, there are included L-α-glycerophosphoethanolamine (GPE), sugars, and analogues thereof, deriving from their presence, or the presence of one of their precursors, in the soya lecithin used as raw material in the GPC production process.

Having obtained this important result, it was of immediate interest to verify in a more sensitive and selective way than in the past, the impurities profile, if present, in samples of GPC obtained by production methods most suitable for the pharmaceutical product for human use.

For this purpose, semi-synthetic processes based on soya lecithin deacylation were mainly considered, being the fully synthetic procedure judged to be unsuitable for the production of GPC for human use, in view of the potential contamination with highly toxic raw materials, such as glycidol or chloropropanediol, that are used in these procedures. While taking into consideration said contraindications related to the production of GPC by a fully synthetic route, a GPC sample of Chinese origin, produced under this approach, was submitted to the new analytical procedure, for a complete evaluation.

The samples deriving from semi-synthetic procedures were generated following the procedures reported in WO9013552 (specifically the Example 2) and EP575717 (specifically the Example 1). In these documents, procedures based on the purification of GPC with ion exchange resins are reported, and they do not involve the precipitation of GPC as adduct with cadmium chloride (GPC*CdCl$_2$) and silica chromatography; these are therefore methods that, avoiding the use of toxic cadmium salts and procedure characterized by low productivity, are really applicable to GPC large scale production.

The analysis results showed, in all the samples, the presence of a peak eluting before and with a retention time very close to that of GPC, having a RRT (Relative Retention Time) equal to about 0.94. This signal, of significant intensity, does not correspond to species that it would have been reasonable to expect in view of the preparation process, such as glycerol, GPE, glycerophosphoric acid, or sucrose. Given that the chromatographic behavior of the new detected species was so similar to that of GPC, as not to have been highlighted until now, and that even with the new HPLC method object of the present invention it differed very little from that of GPC, we then hypothesized that it corresponded to a positional isomer thereof. The chemical structure of the beta isomer of GPC (β-GPC) is reported below.

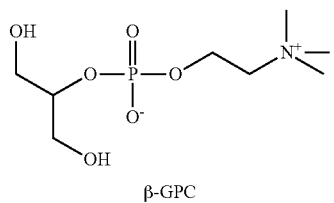 [SMILES: C[N+](C)(C)CCOP(=O)([O-])OC(CO)CO]

β-GPC is not commercially available and, in order to check whether β-GPC could be the species detectable with the new method, its synthesis was carried out according to the scheme illustrated below.

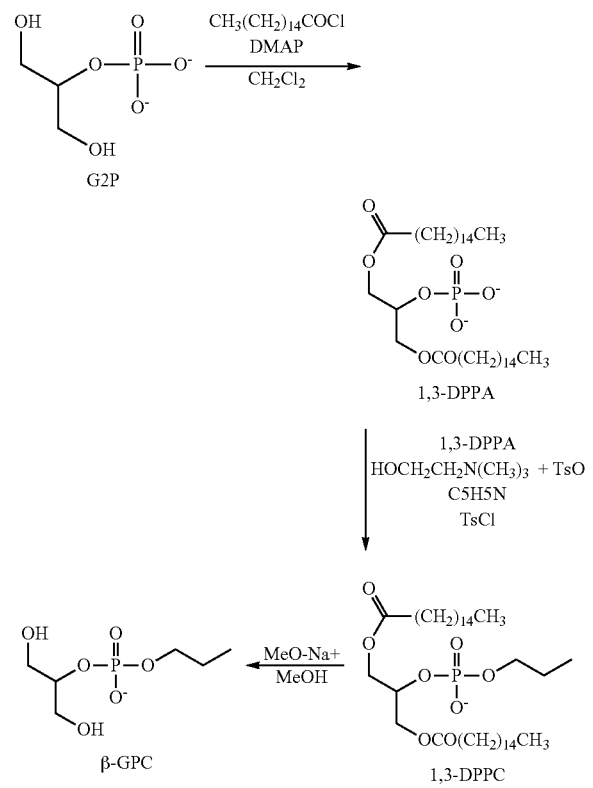

β-GPC thus obtained was analyzed by NMR, to confirm the structure, and by HPLC showing that not only its purity was high, but also that its retention time was compatible with that of the unknown species revealed by analyzing the different GPC samples. It was therefore possible to attribute to the unknown signal a correspondence to the β-GPC structure, and this attribution was confirmed by HPLC "spiking" experiments, wherein to a GPC sample showing the presence of the species with a RRT at about 0.94 in HPLC, calibrated amounts of β-GPC were added, observing the corresponding increase of the signal with RRT at about 0.94 without a splitting thereof.

As further confirmation of the structure attribution, $^{31}$P-NMR experiments were performed that allowed the identification of a signal at about −0.6 ppm in the samples wherein the presence of the species with RRT at about 0.94 was higher. The signal of the β-GPC synthesized following the scheme reported above was revealed at the same field value.

The $^{31}$P-NMR method is therefore a possible alternative to the HPLC procedure, however, due to its lower sensitivity and the wider availability of HPLC instrumentation in quality control laboratories, the HPLC method object of the present invention remains preferable for the determination of the species having RRT of about 0.94 (β-GPC).

By means of $^{31}$P-NMR analysis it was also possible to identify in the spectrum of the product obtained according to EP575717 an additional signal at about 18.4 ppm.

These values are compatible with those of the cyclic phosphate cGP, illustrated below in the form of the sodium salt.

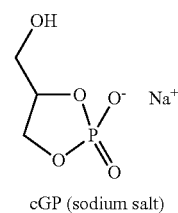

cGP (sodium salt)

The formation of this cyclic phosphate is conceivable in the conditions of isolation of GPC according to the procedure of EP575717. To support this hypothesis, an authentic sample of cGP was prepared according to the scheme illustrated below.

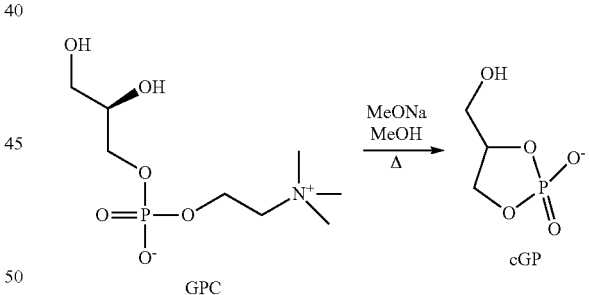

$^{31}$P-NMR analysis of this product confirmed the assignment, showing the same signal at about 18.4 ppm and the absence of splitting of the signal in appropriate spiking experiments.

In the light of what was found with the innovative analytical methods that represent one embodiment of the invention, we have experimentally verified whether the known GPC purification methods could adequately remove the highlighted impurities.

Excluding, for the reasons already expressed, the purification by complexation with cadmium chloride and chromatography on silica, we have identified the crystallization from ethanol as the best procedure, in terms of industrial applicability, among those reported in the prior art (see for example WO9013552).

The sample obtained according to the procedure of WO9013552 was crystallized from ethanol, but the HPLC analysis showed that the purification was only partial, being a significant amount of beta isomer (0.48%) still present in the product.

The following Table 1 summarizes the analytical results of the GPC samples obtained following the different preparation procedures.

TABLE 1

| Sample | Preparation procedure | β-GPC (area % by HPLC) | cGP (area % by $^{31}$P-NMR) | Note |
| --- | --- | --- | --- | --- |
| Procedure 1 | WO9013552 | 0.8% | | |
| Procedure 2 | EP575717 | 0.1% | 0.2% | |
| Example 1 (Comparative) | | 0.48% | | Crystallization from ethanol of the sample from procedure 1 |
| GPC commercial | Synthesis | 1.8% | | Commercial GPC produced in China. Several other impurities present in a total amount of 3% as area % by HPLC |

A new system for the purification of GPC has now been identified, and this finding also represents an embodiment of the invention.

The new purification is based on the use of dimethyl sulfoxide (DMSO). For the realization of the invention, this solvent may be used in different conditions and in different quantitative ratios with respect to the GPC to be purified.

In the embodiment of the invention, in addition to DMSO, other solvents may be present, such as polar, of medium polarity or non-polar solvents. These additional solvents may belong to different classes of solvents such as, but not limited to, halogenated solvents, alcohols, ethers, esters and amides.

Examples of solvents that can be employed for the realization of the invention are, but not limited to, water, methanol, ethanol, isopropanol, n-butanol, methylene chloride, tetrahydrofuran, ethyl acetate, and DMF.

According to an aspect of the invention, DMSO is used in an amount ranging between 2 and 100 parts by volume per one part by weight of L-α-glycerophosphorylcholine, preferably between 3 and 70, more preferably ratios ranging between 4 and 30, more preferably ratios ranging between 5 and 15 parts by volume.

According to a further aspect of the invention, any solvent or any additional solvents are used in a quantity ranging between 0.01 and 10 volumes per volume of DMSO, preferably from 0.05 to 5, more preferably ratios ranging between 0.1 and 1.

Depending on the process parameters, a proper crystallization of GPC may be obtained, or the purification of GPC crystals containing impurities may also be performed by suspending them in DMSO, using suitable combinations of time and temperature, and then separating the crystals from the liquid phase; also in this case other solvents may be present in combination with DMSO.

The purification may be performed at different temperatures; as usual, it may be convenient to adopt different temperatures in the different stages of the purification process, having a lower temperature in the phase of final isolation of GPC.

Suitable temperatures for the conduction of the purification may be between 100° C. and 0° C., preferably between 70° C. and 5° C., more preferably between 50° C. and 15° C.

In choosing the temperature, it would be preferable to take into account the freezing temperature of DMSO, which can vary mainly depending on the presence of additional solvents, and the concentration of GPC and other species present.

For the isolation of GPC, equipment known to the person skilled in the art may be used, such as centrifuges or filtration systems, closed or open. The crystals may be directly subjected to a washing procedure using the same solvent, or the same mixture of solvents, used for the purification; alternatively, for washing the product, solvents or solvent mixtures other than those used in the crystallization or suspension step may be used.

The ratio of DMSO to be used compared to the quantity of GPC used in the purification process object of the invention may vary considerably, and may conveniently be chosen according to the teachings of the art. In practice, in order not to reduce more than required the process productivity, it will be convenient to use not too high quantities of DMSO and, on the other hand, these quantities should not be excessively reduced to avoid creating difficulties in the operations of separation of the crystallized product. DMSO and GPC ratios ranging between 2 and 100 parts by volume (liters) per parts by weight (kg) may be considered convenient for this embodiment, more preferably ratios ranging between 3 and 70, more preferably ratios ranging between 4 and 30, more preferably ratios ranging between 5 and 15 parts by volume per part by weight of GPC.

A particularly advantageous mode to carry out this invention is the crystallization of GPC from its solutions in water, or other solvents, or solvent mixtures. By adding DMSO to such solutions, it was found that solutions that are stable for a time sufficient to conduct the distillation operations without concurrent precipitation of GPC are obtained. Exploiting the higher boiling temperature of the DMSO with respect to the other solvents commonly used, it is therefore possible to modify, without obstacles caused by the simultaneous precipitation of the product, the composition of the mixture of solvents used to perform the crystallization.

Once the solvents mixture composition has been achieved, it is possible to induce the crystallization of GPC by addition of an aliquot of crystallized GPC, that will act as a trigger. This option does not appear to be required; when its application is desired, a sample of GPC crystals may be used as a trigger which should not necessarily have a particularly high purity degree, since a close dependence between the quality of the trigger used and that of the GPC crystals isolated at the end of the purification was not observed.

It was surprising to observe how these purification procedures using DMSO allow to obtain high purity GPC, even from preparations containing significant amounts of other molecular species, including those previously described.

In particular, the ability of the purification system object of the present invention to remove the GPC beta isomer appears significant and unpredictable, since it has chemical-physical characteristics very similar to those of the product whose isolation with a high degree of purity is desired.

Unlike the crystallization from ethanol, it was also found that the purification method object of the invention allows to purify GPC from some of the species most frequently found in GPC preparations obtained from lecithins.

In particular, it was found in embodiments of the invention that it is possible to effectively remove GPC impurities such as sucrose and GPE.

Table 2 below summarizes the main results achieved in these experiments in comparison with those relating to comparative experiments performed using ethanol as the crystallization solvent.

TABLE 2

| Example | Crystallization solvent | Impurity | Impurities present in GPC used as test sample Content (area % by HPLC) | Residual content of impurity in crystallized GPC (area % by HPLC) | Note |
|---|---|---|---|---|---|
| 1 (Comparative) | Ethanol | β-GPC | 0.8% | 0.48% | GPC crystallization obtained by procedure 1 |
| 2 | DMSO | β-GPC | 0.8% | 0.16% | GPC crystallization obtained by procedure 1 |
| 3 | DMSO | β-GPC cGP | 0.1% 0.2%* | <0.01% <0.01%* | GPC crystallization obtained by procedure 2 |
| 4 | DMSO | GPE | 0.2% | <0.01% | GPC crystallization obtained by procedure 3 |
| 5 (comparative) | Ethanol | GPE | 0.2% | 0.02% | GPC crystallization obtained by procedure 3. Low yield. |
| 6 | DMSO | Sucrose | 2% | <0.01% | GPC crystallization obtained by procedure 4. |
| 7 (comparative) | Ethanol | Sucrose | 2% | 0.14% | GPC crystallization obtained by procedure 4. Low yield |

*$^{31}$P-NMR measurement

The results shown in Table 2 highlight the usefulness of the embodiments of the invention in the purification of GPC. In this regard, it is noteworthy the fact that, as in Example 6, the realization of the invention demonstrates the possibility to crystallize GPC also in the presence of sugars, in this case sucrose, and the high purification efficiency achievable even in these cases. Conversely, the GPC crystallization from ethanol did not allow satisfactory removal of sucrose. Moreover, GPC, and in even greater measure sugars such as sucrose, behave as inhibitors of crystallization when ethanol is used as the crystallization solvent; consequently, in these cases the crystallization yields are so low as to render the procedure impractical in processes for the industrial production of GPC.

A further embodiment of the invention consists in GPC whose purity is greater than 99.5%, preferably greater than 99.7%, even more preferably with a purity greater than or equal to 99.9%.

A specific feature is represented by a GPC contaminated by less than 0.1% by its β-GPC isomer, and a GPC contaminated by less than 0.1% by the cyclic species cGP.

For the purposes of the present invention, the purities indicated above are measured as the percentage areas with HPLC methods and/or $^{31}$P-NMR and, preferably, with HPLC methods and/or $^{31}$P-NMR described and exemplified in Examples 8 and 9, respectively.

The following examples are intended to illustrate some of the methods of the invention without in any way limiting it.

EXAMPLES

Procedure 1
Preparation of GPC According to Example 2 of WO9013552
To 125 g of soya lecithin, 500 mL of methanol are added and kept under stirring until complete dissolution. 20 mL of 30% sodium methylate in methanol are added. Stirring is continued at room temperature for 3 hours. After filtration, the residue is washed with methanol (3×10 mL). The filtrate is neutralized (pH of about 6) with glacial acetic acid, then it is concentrated to a residual volume of about 125 mL, the upper oily phase is separated. The enriched lower phase is eluted on a column containing 140 mL of Amberlyst 15 resin (in acid form) set in methanol. The elution is progressed with 375 mL of methanol, followed by 300 mL of water. The aqueous eluate is eluted on a sequence of three chromatographic columns thus prepared: the first with 30 mL of IR 93 resin in OH— form set in water, the second with 30 mL of IR 401 resin in OH— form set in water, the third with 12 mL of IRC 50 resin in acid form set in water.

The final eluate is concentrated to a residue viscous fluid with a water content equal to 15%.

The HPLC-ELSD analysis showed a content of β-GPC equal to 0.8% (area percent).

Procedure 2
Preparation of GPC According to Example 1 of EP575717
200 g of the fraction enriched in phosphatidylcholine obtained commercially by extraction of soy lecithin are dissolved in 600 mL of methanol. The obtained solution is eluted on a chromatographic column containing Duolite A 147 resin in basic form, set in methanol. After loading of the enriched solution, GPC elution is completed with methanol. The eluate is neutralized with acetic acid, and concentrated to a residual volume of 300 mL obtaining a sharp stratification of two phases. The enriched lower phase is separated, diluted with methanol, and extracted twice with 200 mL of n-heptane.

800 mL of n-butanol are added to the enriched lower phase, and the solution is concentrated to a residual volume of about 300 mL, cooled to T~5° C., and filtrated.

The GPC crystals are dissolved in 30 mL of demi water, and the solution is concentrated up to a viscous liquid with a residual content of water equal to 15%. The HPLC-ELSD analysis showed a β-GPC content equal to 0.1% (area percent). The $^{31}$P-NMR analysis showed a cGP content equal to 0.2% (area percent).

Procedure 3
Preparation of GPC Contaminated with GPE
GPE in crystals is added to a solution of GPC in water, the solution is concentrated up to a viscous liquid with a residual content of water equal to 15%.

The HPLC-ELSD analysis showed a GPE content equal to 0.2% (as area percent).

Procedure 4
Preparation of GPC Contaminated with Sucrose

Sucrose in crystals is added to a solution of GPC in water, the solution is concentrated up to a viscous liquid with a residual content of water equal to 15%. The HPLC-ELSD analysis showed a sucrose content equal to 2% (as area percent).

Example 1 (Comparative)

Purification of GPC Obtained by Procedure 1 Using Crystallization from Ethanol 2.5 g of GPC in the form of a viscous fluid (obtained by procedure 1) are dissolved in 5 mL of ethanol under stirring at T~5° C. The solution is cooled down to T~10° C. and triggered with a few GPC crystals, in a few minutes the formation of a precipitate is observed. It is cooled down to T~5° C. and kept under stirring between 0° C. and 5° C. for 1.5 hours, the crystals are filtered through a Buchner funnel, washing with ethanol. After drying under vacuum, 1.4 g of GPC are obtained.

The HPLC-ELSD analysis showed a β-GPC content equal to 0.48% (as area percent).

Example 2

Purification of GPC Obtained by Procedure 1 Using Crystallization from DMSO.

To 2.5 g of GPC in the form of a viscous fluid (obtained by procedure 1), 14 mL of DMSO are added, the mixture is warmed up to T~50° C. under stirring, it is cooled down to ~25° C. and triggered with a few GPC crystals. It is kept under stirring between 20° C. and 25° C. for 16 hours; during this time the formation of a precipitate is observed, the crystals are filtered through a Büchner funnel, washing with ethanol. After drying under vacuum, 1.9 g of GPC are obtained.

The HPLC-ELSD analysis showed a β-GPC content equal to 0.16% (area percent).

Example 3

Purification of GPC Obtained by Procedure 2 Using Crystallization from DMSO.

To 11.2 g of GPC in the form of a viscous fluid (obtained by procedure 2), 60 mL of DMSO are added, the mixture is warmed up to T~50° C. under stirring, it is cooled down to ~25° C. and triggered with a few GPC crystals. It is kept under stirring between 20° C. and 25° C. for 16 hours; during this time the formation of a precipitate is observed, the crystals are filtered through a Buchner funnel, washing with ethanol. After drying under vacuum, 8.2 g of GPC are obtained.

The HPLC-ELSD analysis showed the absence of β-GPC
The $^{31}$P-NMR analysis showed the absence of cGP Example 4

Purification of GPC (Contaminated with GPE) Using Crystallization from DMSO.

To 10.7 g of GPC in the form of a viscous fluid (obtained by procedure 3) 20 mL of DMSO are added, the mixture is warmed up to T~70° C. under stirring, 80 mL of DMSO are added, it is cooled down to T~25° C. and triggered with a few GPC crystals. It is kept under stirring between 20° C. and 25° C. for 16 hours; during this time the formation of a precipitate is observed, the crystals are filtered through a Büchner funnel, washing with ethanol. After drying under vacuum, 8.7 g of GPC are obtained.

The HPLC-ELSD analysis showed the absence of GPE

Example 5 (Comparative)

Purification of GPC (Contaminated with GPE) Using Crystallization from Ethanol 11.2 g of GPC in the form of a viscous fluid (obtained by procedure 3) are dissolved in 20 mL of ethanol under stirring at T~45° C. The solution is cooled down to T~5° C. and triggered with a few GPC crystals. It is kept under stirring between 0° C. and 5° C. for 3 hours; during this time the formation of a precipitate is observed, the crystals are filtered through a Buchner funnel, washing with ethanol. After drying under vacuum, 3.4 g of GPC are obtained.

The HPLC-ELSD analysis showed a GPE content equal to 0.02% (as area percent).

Example 6

Purification of GPC (Contaminated with Sucrose) Using Crystallization from DMSO

To 11 g of GPC in the form of a viscous fluid (obtained by procedure 4) 20 mL of DMSO are added, the mixture is warmed up to T~70° C. under stirring, 80 mL of DMSO are added, it is cooled down to T~25° C.; during this time the formation of a precipitate is observed. It is kept under stirring between 20° C. and 25° C. for 16 hours, the crystals are filtered through a Buchner funnel, washing with ethanol.

After drying under vacuum, 7.8 g of GPC are obtained.

The HPLC-ELSD analysis showed the absence of sucrose

Example 7 (Comparative)

Purification of GPC (Contaminated with Sucrose) Using Crystallization from Ethanol 11.0 g of GPC in the form of a viscous fluid (obtained by procedure 4) are dissolved in 20 mL of ethanol under stirring at T~45° C. The solution is cooled down to T~5° C. and triggered with a few GPC crystals. It is cooled down to T~5° C. and kept under stirring between 0° C. and 5° C. for 2.5 hours; during this time the formation of a precipitate is observed. The crystals are filtered through a Buchner funnel, washing with ethanol. After drying under vacuum, 1.1 g of GPC are obtained.

The HPLC-ELSD analysis showed a sucrose content equal to 0.14% (as area percent).

Example 8

GPC analysis method by HPLC-ELSD.
Operating parameters:
HPLC column: YMC™ Polyamine II 250×4.6 mm (5 μm)
Oven temperature: 35° C.
Flow: 0.7 mL/min
Eluent phases: Phase A: 85% (acetonitrile 75%, methanol 25%)
15% (50 mM ammonium acetate buffer pH 4.5)
Phase B: 65% (acetonitrile 75%, methanol 25%)
35% (50 mM ammonium acetate buffer pH 4.5)

Gradient Program:

| minutes | Phase A % | Phase B % |
|---|---|---|
| 0 | 98 | 2 |
| 5 | 98 | 2 |
| 27 | 2 | 98 |
| 32 | 2 | 98 |
| 33 | 98 | 2 |
| 45 | 98 | 2 |

Detector ELSD
Detector parameters: Nitrogen flow=1.4 mL/min; Temperature=90° C.; Gain=1
Samples preparation: dilution of GPC samples to about 20 mg/mL in methanol.
Injection volume: 20-40 µL
NOTE: The baseline fluctuations that are observed up to RT~5 minutes are present in the blank (not due to substances present in the sample).
In the following table the reference values for the elution of the species of interest are shown.

| Chemical species | RT Retention Time | RRT Relative retention time with respect to GPC |
|---|---|---|
| GPC | ~16.2 min | 1 |
| β-GPC | ~15.3 min | ~0.94 |
| GPE | ~31.5 min | ~1.94 |
| sucrose | ~22.0 min | ~1.36 |

The limit of detection (LOD) of the impurities analyzed using this method is less than 0.01% with respect to GPC Example 9

GPC Analysis Method by $^{31}$P-NMR
Instrument NMR Varian VXR-200 or instruments at least equivalent
Sample preparation 0.8 g of GPC to be analyzed are dissolved in 0.8 mL of $D_2O$ and the solution is charged into the NMR tube
Temperature Ambient temperature
Number of acquisitions Not less than 400
In the following table the reference values for the chemical shift of the species of interest are shown.

| Chemical species | $^{31}$P-NMR chemical shift (ppm) |
|---|---|
| GPC | −0.1 |
| β-GPC | −0.6 |
| GPE | 0.4 |
| cGP | 18.4 |

The limit of detection (LOD) of the impurities analyzed using this method is less than 0.01% with respect to GPC.

The invention claimed is:

1. A process for the purification of L-α-glycerophosphorylcholine, wherein L-α-glycerophosphorylcholine is crystallized from DMSO or a mixture of DMSO with at least another solvent.
2. The process according to claim 1, wherein said at least another solvent is selected from water, alcohol, halogenated solvents, ethers, esters and/or amides.
3. The process according to claim 2, wherein said alcohol is methanol, ethanol, isopropanol and/or n-butanol; said halogenated solvent is methylene chloride; said ether is tetrahydrofuran; said ester is ethyl acetate; said amide is DMF.
4. The process according to claim 1, wherein DMSO is used in an amount comprised between 2 and 100 parts by volume per part by weight of L-α-glycerophosphorylcholine.
5. The process according to claim 4, wherein said at least another solvent is used in amounts comprised between 0.01 and 10 volumes per volume of DMSO.
6. The process according to claim 1, wherein said crystallization is carried out at a temperature ranging between 0° C. and 100° C.
7. A method for determining the purity of L-α-glycerophosphorylcholine comprising
    eluting L-α-glycerophosphorylcholine through an HPLC column having an amino stationary phase, and
    subsequent detecting L-α-glycerophosphorylcholine itself, and any possible impurity thereof, by means of an Evaporative Light Scattering Detector type.
8. The method according to claim 7, wherein said stationary phase has secondary and tertiary amino groups.
9. The method according to claim 7, wherein said stationary phase consists of particles of support material, with a polymer coating containing amino groups.
10. The method according to claim 7, wherein the eluent phases consist of an aqueous solution, a polar organic solvent, or a mixture thereof.
11. The method according to claim 10, wherein said aqueous solution has a pH ranging between 3 and 6.
12. The method according to claim 10, wherein said polar organic solvent is a C1-C4 alcohol, acetonitrile, or a mixture thereof.
13. The method according to claim 12, wherein said C1-C4 alcohol is methanol.

* * * * *